US006965657B1

(12) United States Patent
Rezvani et al.

(10) Patent No.: US 6,965,657 B1
(45) Date of Patent: Nov. 15, 2005

(54) METHOD AND APPARATUS FOR INTERFERENCE CANCELLATION IN SHARED COMMUNICATION MEDIUMS

(75) Inventors: Behrooz Rezvani, Pleasanton, CA (US); Sam Heidari, Fremont, CA (US)

(73) Assignee: Velocity Communication, Inc., Fremont, CA (US)

( * ) Notice: Subject to any disclaimer, the term of this patent is extended or adjusted under 35 U.S.C. 154(b) by 774 days.

(21) Appl. No.: 09/779,257

(22) Filed: Feb. 7, 2001

Related U.S. Application Data (63) Continuation of application No. 09/728,143, filed on Dec. 1, 2000.

(60) Provisional application No. 60/168,602, filed on Dec. 1, 1999, provisional application No. 60/172,445, filed on Dec. 17, 1999, provisional application No. 60/175,012, filed on Jan. 7, 2000.

(51) Int. Cl.[7] .............................................. H03D 1/04
(52) U.S. Cl. ........................ 375/346; 375/349; 375/350
(58) Field of Search ................. 375/259–285, 375/316–352

(56) References Cited

U.S. PATENT DOCUMENTS

| 4,682,358 | A | | 7/1987 | Werner |
| 5,052,000 | A | | 9/1991 | Wang et al. |
| 5,271,037 | A | * | 12/1993 | Szechenyi .................... 375/259 |
| 5,731,706 | A | | 3/1998 | Koeman et al. |
| 5,887,032 | A | * | 3/1999 | Cioffi .......................... 375/257 |
| 5,970,088 | A | | 10/1999 | Chen |
| 6,002,722 | A | | 12/1999 | Wu |
| 6,011,814 | A | | 1/2000 | Martinez et al. |
| 6,038,251 | A | | 3/2000 | Chen |
| 6,212,225 | B1 | * | 4/2001 | Agazzi ......................... 375/220 |
| 2003/0190000 | A1 | * | 10/2003 | Matsumoto .................. 375/350 |

* cited by examiner

Primary Examiner—Stephen Chin
Assistant Examiner—Curtis Odom
(74) Attorney, Agent, or Firm—IP Creators; Charles C Cary (57) ABSTRACT

An apparatus and method for reducing interference over a common communication medium, wired or wireless is provided. The apparatus reduces interference from a number of sources using a common architecture which may be used to service a modem pool or discrete modems which share the common communication medium. Interference due to near end cross-talk (NEXT), self-NEXT or echo, and far end cross-talk (FEXT) may all be substantially reduced or cancelled by the apparatus. Additionally, channel characteristics for individual data channels across the common communication medium may be determined. The apparatus provides support for multiple modem protocols including X-DSL protocols such as G.Lite, ADSL, VDSL, SDSL, MDSL, RADSL, and HDSL. The apparatus supports multiple line codes such as the discrete multi-tone (DMT) and carrier less AM/PM (CAP) line codes associated with X-DSL communications. The apparatus may be implemented in hardware, firmware or software. The apparatus has a compact form factor due to pooling of the interference canceling elements.

26 Claims, 7 Drawing Sheets

METHOD AND APPARATUS FOR INTERFERENCE CANCELLATION IN SHARED COMMUNICATION MEDIUMS

This application is a continuation of copending U.S. application Ser. No. 09/728,143 filed Dec. 1, 2000 entitled "METHOD AND APPARATUS FOR INTERFERENCE CANCELLATION IN SHARED COMMUNICATION MEDIUMS" which claims the benefit of prior filed Provisional Applications No. 60/168,602 filed on Dec. 1, 1999 entitled "Universal X-DSL Architecture"; 60/172,445 filed on Dec. 17, 1999 entitled "Spectrum Manager for Loop Qualification and X-Talk Cancellation" and 60/175,012 filed on Jan. 7, 2000 entitled "Ranging Algorithm For Channel Estimation For X-DSL Application". Each of the above-cited applications is incorporated herein by reference in its entirety.

BACKGROUND OF THE INVENTION

1. Field of Invention

The field of the present invention relates in general to modems and more an particularly digital modems.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation. Currently there are over ten discrete X-DSL standards, including: G.Lite, ADSL, VDSL, SDSL, MDSL, RADSL, HDSL, etc. Within each standard there are at least two possible line codes, or modulation protocols, discrete multi-tone (DMT) and carrier less AM/PM (CAP).

The primary factor limiting the bandwidth or channel capacity of any of the above discussed X-DSL protocols is noise, whether that noise be from echo, channel cross talk, impulse or background sources. Efforts are made throughout the DSL architecture to minimize noise.

For voice applications a certain amount of echo was considered a positive feedback for telephone conversations until the longer delays introduced by satellite links permeated the system. For a DSL system echo effects signal integrity and introduces unacceptable errors in data transmissions. An echo canceller synthesizers the echo path including the digital analog converter, the transmit filter, the hybrid circuit, the receiver filter, in the analog-to-digital converter. An echo canceller can produce an echo replica with the same transmitting data but with reverse signed to cancel the real echo on the receive path.

The topology of subscriber lines themselves may be used to minimize cross-talk between subscriber lines. Typically, telephone subscriber loops are organized in a binder with 10, 25, or 50 pairs each sharing a common physical or electrical shield in a cable. Due to capacitance and inductive coupling there's cross-talk between each twisted pair even though the pairs are well insulated for DC. The effective cross-talk is reduced by adapting different twist distances among different pairs in the binder group. Binder groups are also twisted such that no two groups are adjacent for long runs.

The hybrid circuit which couples the modem to the subscriber line is also designed with noise reduction in mind. The hybrid is basically a bridge circuit which allows bi-directional communication on the subscriber line. When the bridge is balanced the spillover of noise from the modem's transmitted signal to the received signal is reduced. Balancing however requires an impedance match with the telephone subscriber loop which is never fully satisfied because the input impedance of the telephone loop varies from one loop to the next due to taps and temperature variations in the individual subscriber lines.

Cross-talk noise comes from a adjacent telephone subscriber loops of the same or different types of transmission systems. Cross-talk is divided into what is known as near end cross talk (NEXT) and far end cross-talk (FEXT) depending on where the cross-talk is generated. NEXT is defined as cross-talk between subscriber lines in a binder coupled on one end with a common transceiver. FEXT is defined as a cross-talk affect between a receiving path and a transmitting path of the DSL transceivers on opposite ends of two different subscriber loops within the same twisted pair cable or binder. The FEXT noise at the receiver front end of a particular DSL transceiver is caused by signals transmitted by other transceivers at the opposite end of the twisted cable.

Several patents are directed to devices which address discrete portions of the overall problem of reducing noise in subscriber line communications. None address the overall problem. U.S. Pat. No. 4,682,358 relates to echo cancellation; U.S. Pat. No. 5,052,000 relates to equalizers, U.S. Pat. No. 5,970,088 addresses NEXT cancellation. The apparatus disclosed in each of the patents are implemented in various portions in both analog and digital form.

What is needed is modem with improved capabilities for noise and echo cancellation.

SUMMARY OF THE INVENTION

An apparatus and method for reducing interference over a common communication medium, wired or wireless is provided. The apparatus reduces interference from a number of sources using a common architecture which may be used to service a modem pool or discrete modems which share the common communication medium. Interference due to near end cross-talk (NEXT), self-NEXT or echo, and far end cross-talk (FEXT) may all be substantially reduced or cancelled by the apparatus. Additionally, channel characteristics for individual data channels across the common communication medium may be determined. The apparatus provides support for multiple modem protocols including X-DSL protocols such as G.Lite, ADSL, VDSL, SDSL, MDSL, RADSL, and HDSL. The apparatus supports multiple line codes such as the discrete multi-tone (DMT) and carrier less AM/PM (CAP) line codes associated with X-DSL communications. The apparatus may be implemented in hardware, firmware or software. The apparatus may have a compact form factor due to pooling of the interference canceling elements.

In an embodiment of the invention a system for suppressing interference in a communication of data channels across a common communication medium is disclosed. The system includes a first and second set of modems and an interference canceller. The first and second set of modems are coupled to the common communication medium for transport and reception of corresponding data channels there through. The interference canceller is coupled with the second set of modems. The interference canceller is configured to coordinate, during a training phase, transmissions of selected interfering data channels of the first set of modems and the second set of modems with reception of a selected victim channel at a corresponding one of the second set of modems. The interference canceller adaptively derives interference cancellation coefficients between each victim data channel and each interfering data channel and applies the derived interference cancellation coefficients during a runtime phase to digitized samples of the data channels received by each of second set of modems to substantially cancel interference in the digitized samples.

In an alternate embodiment of the invention an apparatus for suppressing interference in a communication of data channels across a common communication medium is disclosed. The apparatus for suppressing interference comprises a plurality of analog front ends (AFE's), at least one digital signal processor (DSP), and an interference canceller. The plurality of AFE's are each coupled to a common communication medium for transmission and reception of corresponding channels of data there through. The at least one digital signal processor (DSP) processes the corresponding channels of data. The interference canceller is coupled with the second set of modems and configured to coordinate, during a training phase, transmissions of selected interfering data channels with reception of a selected victim channel at a corresponding one of the plurality of AFEs. The interference canceller adaptively derives interference cancellation coefficients between each victim data channel and each interfering data channel. The interference canceller applies the derived interference cancellation coefficients during a runtime phase to digitized samples of the data channels received by each corresponding one of the plurality of AFEs to substantially cancel interference in the digitized samples.

In still another embodiment of the invention a method for suppressing interference in a communication of data channels across a common communication medium is disclosed. The system for suppressing interference comprising the acts of adaptively filtering selected transmitted interfering data channels with at least one selected received data channel to determine during a training phase interference cancellation coefficients there between;

selecting for each received data channel at least one significant interfering data channel among the transmitted data channels based on said interference cancellation coefficients determined in said act of adaptively filtering; and exclusively applying during a runtime phase the interference cancellation coefficients associated with the at least one significant interfering data channel selected in said selecting act to digitized samples of each corresponding received data channel to substantially cancel interference in the digitized samples.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

An apparatus and method for reducing interference over a common communication medium, wired or wireless is provided. The apparatus reduces interference from a number of sources using a common architecture which may be used to service a modem pool or discrete modems which share the common communication medium. Interference due to near end cross-talk (NEXT), self-NEXT or echo, and far end cross-talk (FEXT) may all be substantially reduced or cancelled by the apparatus. Additionally, channel characteristics for individual data channels across the common communication medium may be determined. The apparatus provides support for multiple modem protocols including X-DSL protocols such as G.Lite, ADSL, VDSL, SDSL, MDSL, RADSL, and HDSL. The apparatus supports multiple line codes such as the discrete multi-tone (DMT) and carrier less AM/PM (CAP) line codes associated with X-DSL communications. The apparatus may be implemented in hardware, firmware or software. The apparatus has a compact form factor due to pooling of the interference canceling elements.

Figure 1:
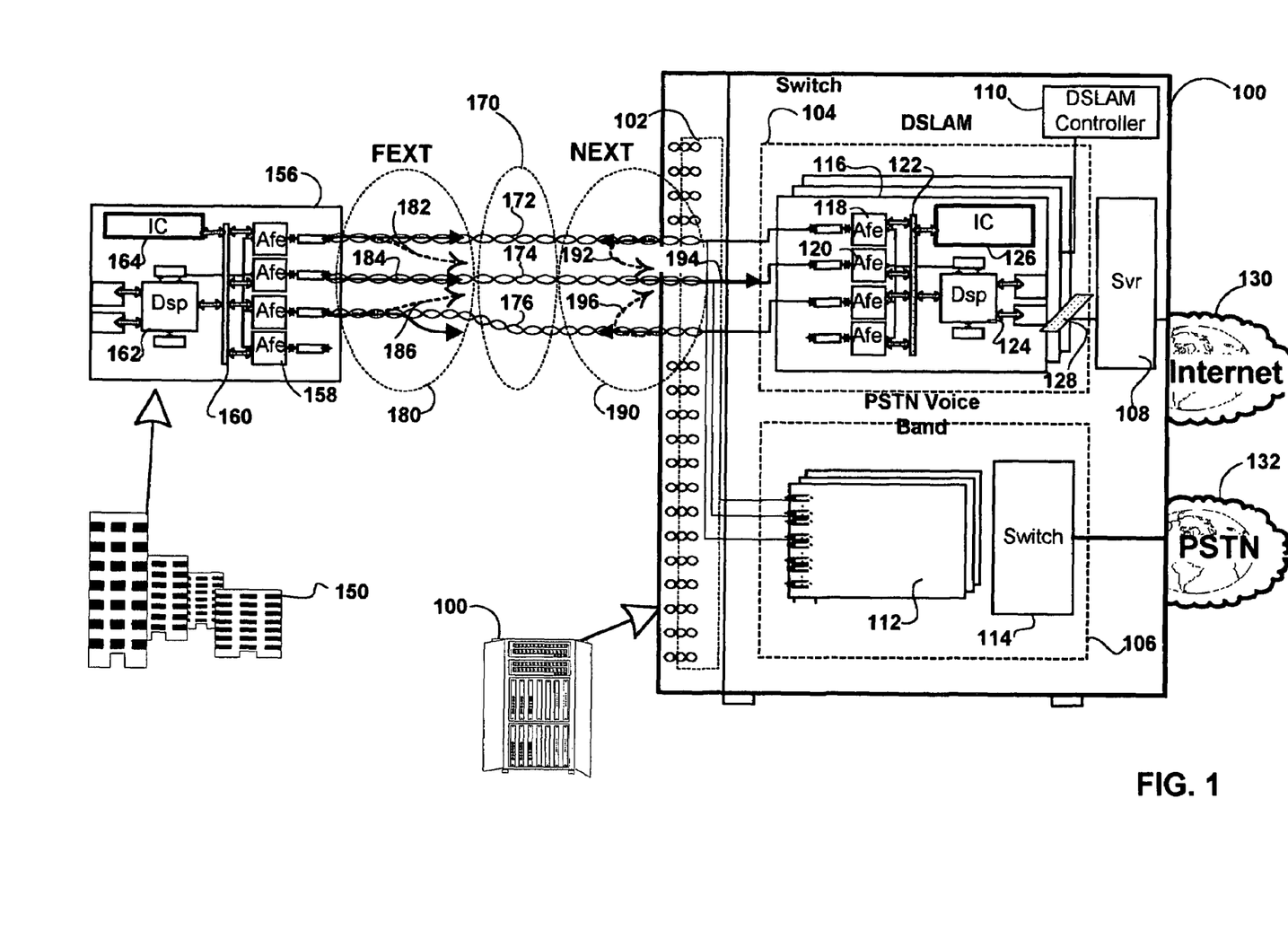
FIG. 1 shows a communication system with a pair of multi-mode multi-channel modem line cards coupled to one another by a binder of subscriber lines between a public switched telephone network (PSTN) central office (CO) and a remote site.

FIG. 1 shows a communication system with a pair of multi-mode multi-channel modem line cards coupled to one another by a binder of subscriber lines between a public switched telephone network (PSTN) central office (CO) and a remote site. The system includes a CO 100 and a remote line card 156 positioned at a remote terminal 150. The CO and remote line card are coupled to one another via a subscriber line binder 170 which includes individual subscriber lines 172, 174, 176.

Each of the subscriber line connections terminates on the CO end, in the frame room 102 of the CO. From this room connections are made for each subscriber line via splitters and hybrids to both a DSLAM 104 and to the voice band racks 106. The splitter shunts voice band communications to dedicated line cards, e.g. line card 112 or to a voice band modem pool (not shown). The splitter shunts higher frequency X-DSL communications on the subscriber line to a selected line card, e.g. line card 116, within DSLAM 104. The line cards of the current invention are universal, meaning they can handle any current or evolving standard of X-DSL and may be upgraded on the fly to handle new standards.

Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card includes a plurality of AFE's 118–120 each capable of supporting a plurality of subscriber lines. The AFEs are coupled via a packet based bus 122 to an interference canceller (IC) 126 and to the DSP 124. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO the AFE each received channel is converted to a digitized data sample which is sent to the IC. In the IC the effects of various forms of interference on the digitized data sample are cancelled and the corrected digitized data sample for that channel and others is sent to the DSP where they are demodulated. The DSP is capable of multi-protocol support for all subscriber lines to which the AFE's are coupled. Communications between AFE's, IC and DSP(s) may be packet based, in which embodiment of the invention a distributed architecture such as will be set forth in the following FIG. 2 may be implemented. The line card 116 is coupled to a back-plane bus 128 which may be capable of offloading and transporting low latency X-DSL traffic between other DSPs for load balancing. The back-plane bus of the DSLAM also couples each line card to the Internet via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. When an X-DSL communication is established on a subscriber line, a specific channel identifier is allocated to that communication. That identifier is used in the above mentioned packet based embodiment to track each packet as it moves in an upstream or downstream direction between the AFE, IC, and DSP.

At the remote site a similar line card architecture is shown for line card 156 which forms a plurality of logical modems connected to corresponding ones of subscriber lines 172, 174, 176. That line card includes AFEs 158, a packet bus 160, an interference canceller 164 and a DSP. In alternate embodiments of the invention only one of the terminating line cards 156,116 for subscriber line binder 170 would have an interference canceller. In an alternate embodiment of the invention the termination at the remote site 150 would be a set of discrete modems each coupled to an associated one of the subscriber lines rather than the logical modem shown. These modules, AFE and DSP, may be found on a single universal line card, such as line card 116 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

The interference canceller 126 serves to eliminate various forms of interference from the upstream channels received at the CO from the subscriber line binder 170. The interference canceller operates during a training phase to establish coefficients for various types of interference using adaptive filters which will be discussed in greater detail in connection with the following FIGS. 2–7. The various forms of interference are shown for subscriber line 174.

Far end cross talk (FEXT) occurs as a result of transmissions from the remote site on subscriber lines 172 and 176 leaking into communications 196 received by the CO on subscriber line 174. This leakage is represented by arrows 182,186 from subscriber lines 172, 176 respectively into the channel 194 received at the CO on subscriber line 174. Channel attenuation/response, is the next form of interference which is the spectral difference between the transmitted and received signal on any given subscriber line. This determines which X-DSL protocol the channel will support, and at what power levels and bit/symbol ratio. This is represented by arrow 184, i.e. the transmission of the remote site on subscriber line 174 and the spectral attenuation of that signal after being transmitted through subscriber line 174. Near end cross-talk (NEXT) results from transmissions from the CO leaking over into reception at that same location. This leakage is represented by arrows 192,196 from subscriber lines 172, 176 respectively into the channel 194 received at the CO on subscriber line 174. Self-NEXT, a.k.a echo, occurs on every subscriber line including line 174.

Figure 2:
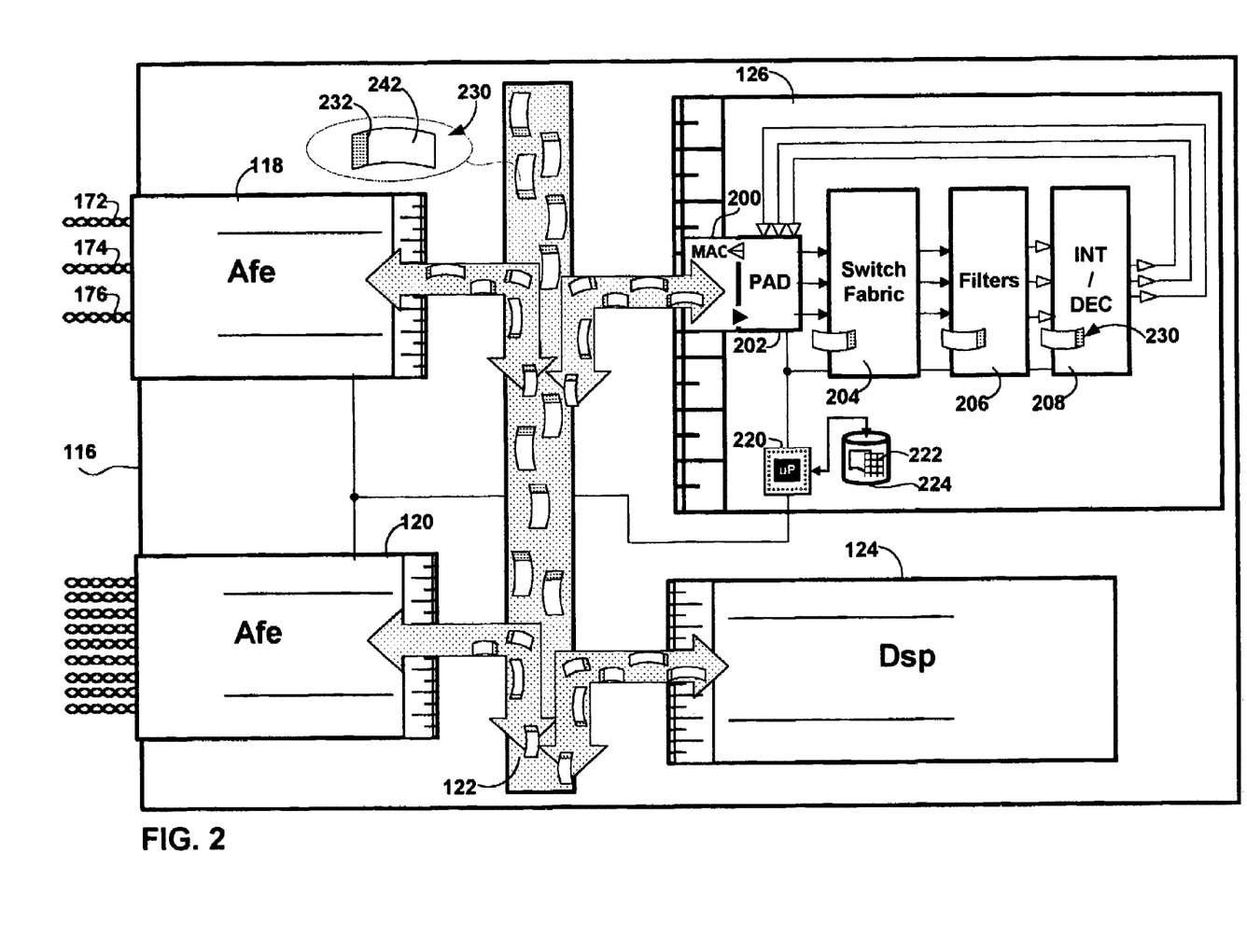
FIG. 2 is a detailed hardware block are hardware block diagram of one of the modem line cards shown in FIG. 1.

FIG. 2 is a detailed hardware block are hardware block diagram of one of the line cards 116 shown in FIG. 1. The line card includes AFEs 118–120, bus 122, DSP 124, and Interference canceller 126. This line card serves as a plurality of discrete logical modems each with an associated communication channel. In this embodiment a single DSP 124 handles modulation and demodulation of multiple discrete logical communication channels which are received from and transmitted to the corresponding AFE. Each AFE 118, 120 couples to one or more subscriber lines, with each subscriber line handling a communication channel. AFE 118 couples with subscriber lines 172,174, 176 (See FIG. 1). In the embodiment shown packets 230 with a header portion 232 and a data portion 242 are used to transport upstream and downstream data associated with each channel between the various components. There are two phases of data flow on the line card, i.e. a training phase and an operational phase.

During the training phase the interference on each received channel is determined with respect to each interfering channel. The IC 126 configures these activities through communications via packet or dedicated control line with the local and remote logical modems i.e. AFEs 158 together with DSP 162 and AFEs 118–120 together with DSP 124. FEXT determination requires one or more remote interferers, e.g. interferers 182, 186 and the channel attenuation to be adaptively filtered out of the received channel 194 on subscriber line 174 (See FIG. 1). NEXT determination requires one or more local interferers, e.g. interferers 192, 186 and echo to be adaptively filtered out of the received channel 194 on subscriber line 174 (See FIG. 1).

In an embodiment of the invention, a receiving channel in the central office and an interfering channel, either local or remote is selected. The interferer transmits a training sequence, e.g. a random number string. If the interferer is remote the associated packets of digitized data generated by the corresponding AFE upon receipt of the interfering channels transmissions is passed to the IC. The AFE also "listens" on the selected receiving channel and the corresponding packetized digitized data is passed to the IC as well. Where the interferer is local, the packet passed to the IC comes directly from the DSP 124. The packet identifies the interfering channel in the header 232, and contains the digitized symbols generated by the DSP which corresponds with the above mentioned training sequence.

Within the IC a medium access control (MAC) 200, a packet assembler and disassembler (PAD) 202, a switch fabric 204, adaptive filters 206, interpolator and decimator 208, processor 220, memory 224 and tables and program code 222 are shown. The processor controls the operation of the IC using program code and tables stored in memory 224. The packets are detected on the bus by the MAC which places them in discrete buffers in the PAD on the basis of their channel ID. The PAD removes the header and passes the digitized data from the interferer and receiving channel through the switch fabric 204 to the filter 206. The filter includes banks of adaptive filters (See FIG. 3). In an embodiment of the invention the number of banks equals the number of receiving channels. Each bank may include adaptive filters substantially equal in number to the total number of interfering channels. Alternately, in another embodiment of the invention each bank may include fewer adaptive filters than the number of interfering channels. In either embodiment the digitized data from both packets provides the inputs to a single adaptive filter and a coefficient generator attached thereto. The coefficient generator manipulates the coefficients to correspond with the interference of the selected interferer on the selected receiving channel. These coefficients are stored in table 222 within memory 224. All coefficients are calculated for all interferers with respect to all channels and the coefficients associated therewith are stored in table 222 in memory 224. In an embodiment of the invention in which the number of adaptive filters in each received channel bank substantially equals the number of interfering channels, this calculation of coefficients completes the training phase.

In the alternate embodiment in which the number of adaptive filters in each received channel bank is less than the number of interfering channels there is a resource constraint which requires an additional step before commencement of the operational phase. In this embodiment of the invention those interfering channels that are most dominant for any selected receiving channel are determined and the cross bar switch is configured to map a selected adaptive filter in each bank to the associated dominant interferers received signal buffer within PAD 202.

The next phase of the logical modem is the operational phase. In the operational phase upstream and downstream communication channels in the CO pass across the bus 122 between the AFEs 118–120 and the DSP. Each downstream packet passes from the DSP to the appropriate AFE via the IC. Each upstream packet which is placed on the bus by the AFEs passes to the IC. In the IC the channel correspondence of each packet is determined and the digitized data from that packet is passed through the switch fabric to the appropriate bank of adaptive filters. The digitized data is filtered using the combined coefficients generated in the training phase to remove the combined interference. The packet is then passed to the interpolator decimator 208. Within the interpolator decimator any up or down sampling of the channel to correspond with its bandwidth is performed. For example where the AFE samples multi-protocol X-DSL traffic, i.e. G.Lite and ADSL at the same rate it would be necessary to decimate the digitized data for the G.Lite channel(s) to match the comparatively lesser bandwidth of that channel.

After any required interpolation or decimation the packet is returned to the PAD where it is packetized with a header configured to direct the packet to the DSP for demodulation of the digitized data contained therein.

In alternate embodiments of the invention either or both the CO and the remote site may include interference cancellers. In an alternate embodiment of the invention the AFE, IC, and DSP are point-to-point connected via dedicated control lines rather than by a packet based bus. In an alternate embodiment of the invention the IC may be part of the DSP or AFE.

Figure 3:
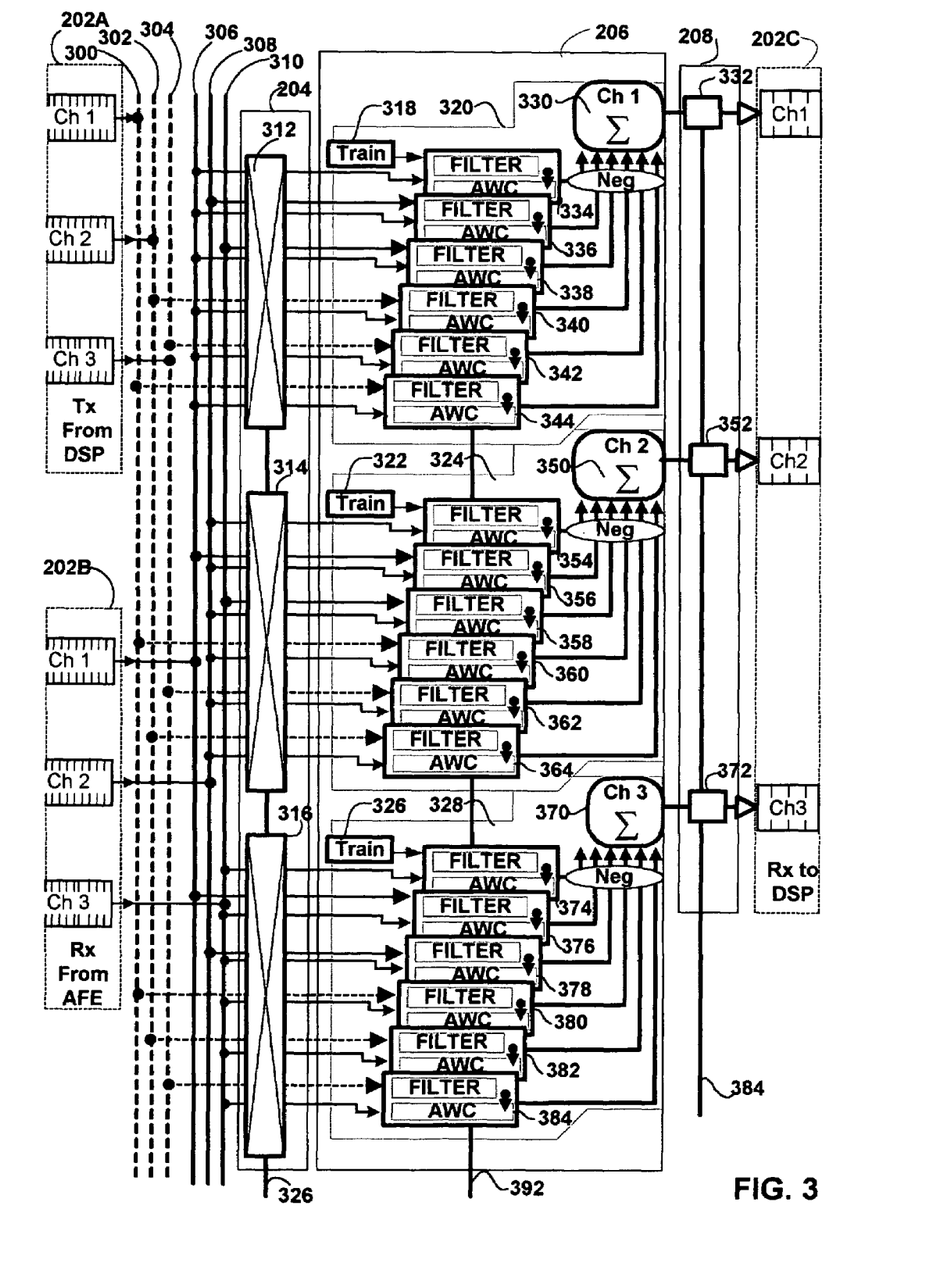
FIG. 3 is a detailed hardware block diagram of an interference canceller portion of the modem line card shown in FIG. 2.

FIG. 3 is a detailed hardware block diagram of a interference canceller portion of the modem line card shown in FIG. 2. The PAD 202 (See FIG. 2) is shown split into three banks 202A–C of buffers. Bank 202A contains the input FIFO buffers for the downstream packets received from the local DSP during the training phase. PAD 202B contains the corresponding FIFO buffers for the upstream packets from the AFE. Pad 202C is the output buffer for the interference cancelled packets output by the IC to the local DSP during the operational phase.

The FIFO buffers within input buffer banks 202A–B are coupled to a corresponding bus to aid in visualizing the connections from the buffers to the cross fabric switch 204 and filters 206 which are also shown. Buses 300,302,304 transport downstream (transmitted from the DSP 124 See FIG. 1) packets of digitized data associated with Channels 1,2, and 3 respectively. Buses 306,308,310 transport upstream (received by the AFE 118 in FIG. 1) packets of digitized data associated with Channels 1,2, and 3 respectively. Fabric switch 204 includes switches 312, 314, 316 for each individual bank of adaptive filters associated with channels 1,2 and 3 respectively. The connections formed by the fabric switch may be controlled by the processor 220 (See FIG. 2) via signal line 326. The filter 206 contains three filter banks 320, 324, 328 which correspond in number with the number of channels received.

Each filter bank contains a number of filters each of which share a common input from the corresponding received channel and an interference input for the transmission of the interferer channel.

Filter bank 320 contains six filter modules 334–344 the inverted outputs of which couple to an associated summer 330. The output of the summer passes through interpolator or decimator 208 and specifically an associated module 332 thereof. This module serves during the operational phase to decrease (decimate) or increase (interpolate) the number of digitized bits in each outgoing interference cancelled packet to match the required bandwidth of that packet. The packet then passes to buffer bank 202C and specifically a channel 1 output buffer portion thereof.

All the filters have two inputs one of which provides the upstream data packets from the AFE for Channel 1. The remaining inputs correspond with the respective interferer. The first filter module 334 accepts a training or source signal to calculate the coefficients which correspond with the Channel 1 spectral response. Filters 336 and 338 accept inputs from the remaining upstream channels 2,3 to calculate FEX coefficients for these two interferers during training and to cancel interference from these two channels during the operational phase. Filters 340 and 342 accept inputs from the locally transmitted channels 2,3 respectively to calculate NEXT coefficients for these two interferers during training and to cancel interference from these two channels during the operational phase. The remaining filter 344 accepts the remotely accepted transmissions of channel 1 as input during training to calculate coefficients and to cancel self-NEXT interference during the operational phase.

Filter bank 324 contains six filter modules 354–364 the inverted outputs of which couple to an associated summer 350. The output of the summer passes through interpolator or decimator 208 and specifically an associated module 352 thereof. This module serves during the operational phase to decrease (decimate) or increase (interpolate) the number of digitized bits in each outgoing interference cancelled packet to match the required bandwidth of that packet. The packet then passes to buffer bank 202C and specifically a channel 2 output buffer portion thereof.

All the filters have two inputs one of which provides the upstream data packets from the AFE for Channel 2. The remaining inputs correspond with the respective interferer. The first filter module 354 accepts a training or source signal to calculate the channel 2 spectral response. Filters 356 and 358 accept inputs from the remaining upstream channels 1,3 to calculate FEXT coefficients for these two interferers during training and to cancel interference from these two channels during the operational phase. Filters 360 and 362 accept inputs from the locally transmitted channels 1,3 respectively to calculate NEXT coefficients for these two interferers during training and to cancel interference from these two channels during the operational phase. The remaining filter 364 accepts the remotely accepted transmissions of channel 2 as input during training to calculate coefficients and to cancel self-NEXT interference during the operational phase.

Filter bank 328 contains six filter modules 374–384 the inverted outputs of which couple to an associated summer 370. The output of the summer passes through interpolator or decimator 208 and specifically an associated module 372 thereof. This module serves during the operational phase to decrease (decimate) or increase (interpolate) the number of digitized bits in each outgoing interference cancelled packet to match the required bandwidth of that packet. The packet then passes to buffer bank 202C and specifically a channel 3 output buffer portion thereof.

All the filters have two inputs one of which provides the upstream data packets from the AFE for Channel 3. The remaining inputs correspond with the respective interferer. The first filter module 374 accepts a training or source signal in order to calculate coefficients which correspond with the channel spectral response. Filters 376 and 378 accept inputs from the remaining upstream channels 1,2 to calculate FEXT coefficients for these two interferers during training and to cancel interference from these two channels during the operational phase. Filters 380 and 382 accept inputs from the locally transmitted channels 1,2 respectively to calculate NEXT coefficients for these two interferers during training and to cancel interference from these two channels during the operational phase. The remaining filter 384 accepts the remotely accepted transmissions of channel 3 as input during training to calculate coefficients and to cancel self-NEXT interference during the operational phase.

In an alternate embodiment of the invention where the number of filters in each bank is less than the number of interferers the following method is effected by the switch fabric and filters under control of the processor 220 (See FIG. 2). As each interferer-receiver pair of channels is selected the cross-fabric switch couples the digitized data from the interferer and receiver pair to one of the filters in the bank. The cancellation coefficients are calculated and stored in memory 224. This process is continued through all interferers until the relative magnitude of interferers may be calculated. Then the fabric switch is used to couple the appropriate input buffers which correspond with the most significant interferers for each channel to the available filters in the filter bank for each channel. This has the benefit of substantially reducing the number of components and processing power required to substantially reduce interference in the received packets.

Figure 4:
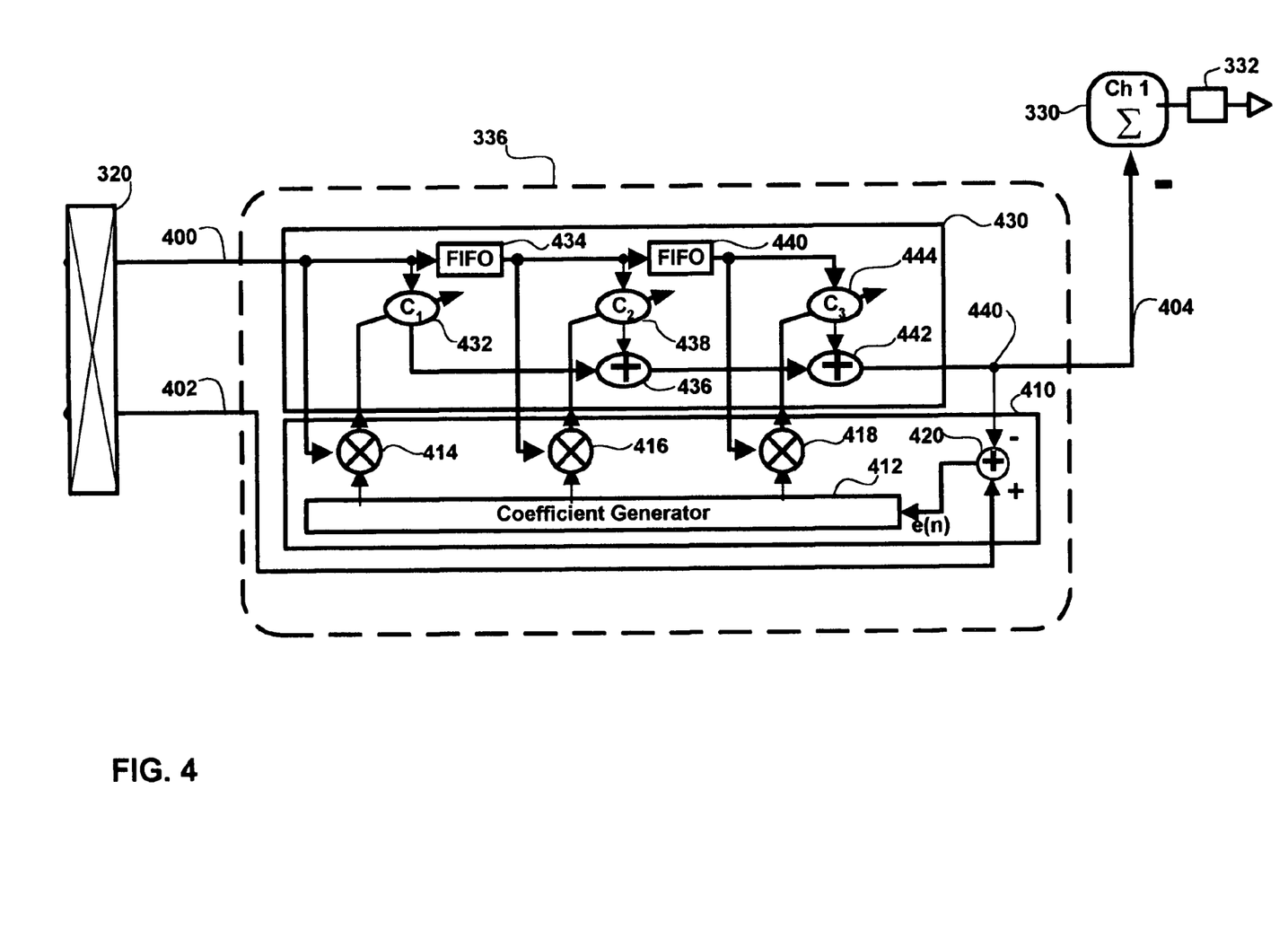
FIG. 4 is a detailed hardware block diagram of one of a filter portion of the spectrum manager shown in FIG. 3.

FIG. 4 is a detailed hardware block diagram of one of a filter portion of the spectrum manager shown in FIG. 3. Filter 336 is shown with interferer input 400 and received channel input 402 coupled to fabric switch 320. The inverted output of the filter 404 provides one input to summer 330 for the Channel 1 interference filter bank. In an embodiment of the invention shown the adaptive filter 336 includes a standard transversal filter 430 and adaptive weight-control mechanism (AWC) 410. The AWC includes a differencer 420 a coefficient generator 412, and scalers 414–418. The transversal filter has, in the example shown, 3 taps. FIFO buffers 434,440, coefficient scalers 432,438 and 444, summers 436 and 442 are shown.

During training an adaptive and a filtering process are implemented. The adaptive process involves the automatic adjustment of a set of tap weights. The filtering process involves (a) forming the inner produce of a set of tap inputs and the corresponding set of tap weights emerging from the adaptive process to produce an estimate of a desired response, and (b) generating an estimation error by comparing this estimate with the actual value of the desired response the estimation error is in turn used to actuate the adaptive process thereby closing the feedback loop. The transversal filter performs the filtering process and the AWC performs the adaptive control process.

In the operational phase the desired response, e.g. Channel 1 is supplied for processing on line 402 alongside the tap input vector, e.g. interferer. Given this input, the traversal filter produces an output used as an estimate of the desired response. The estimation error and the interferer input are applied to the control mechanism and the feedback loop around the tap weights is thereby closed.

Figure 5:
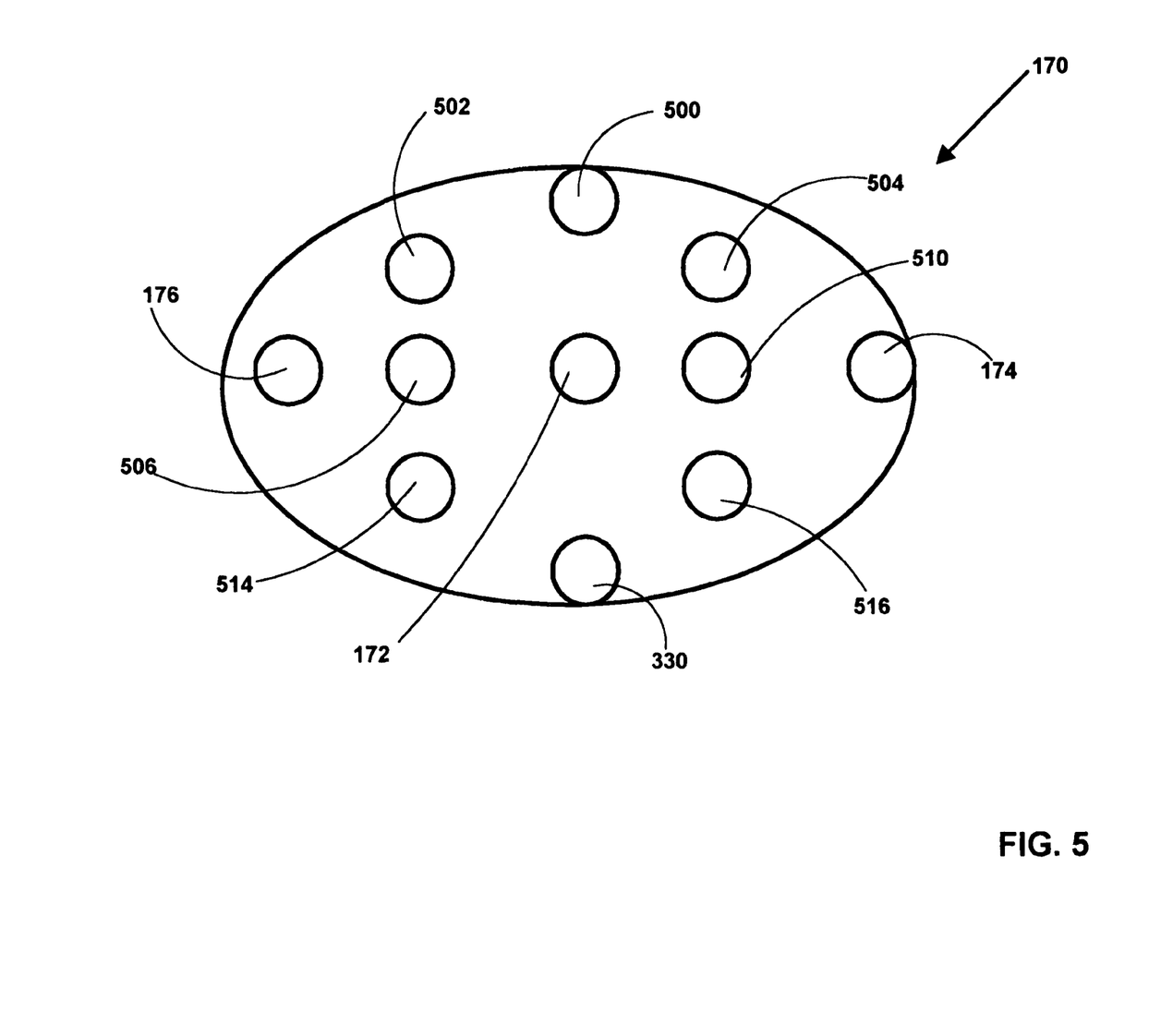
FIG. 5 is a cross-sectional elevation view of a subscriber line binder shown in FIG. 1.

FIG. 5 is a cross-sectional elevation view of a subscriber line binder 170 shown in FIG. 1. Lines 172, 74, 176 are shown surrounded by other subscriber lines 500–516 within the binder. Interference from one interferer with any receiving channel may vary due to proximity or shielding. Thus at this cross-section in the binder the most significant interferers with subscriber line 176 are subscriber lines 502,506, 514. Proximity and other effects may operate to make the selection of significant interferers appropriate thereby allowing the reduction in the number of filters required to interference cancel any one channel.

Figure 6:
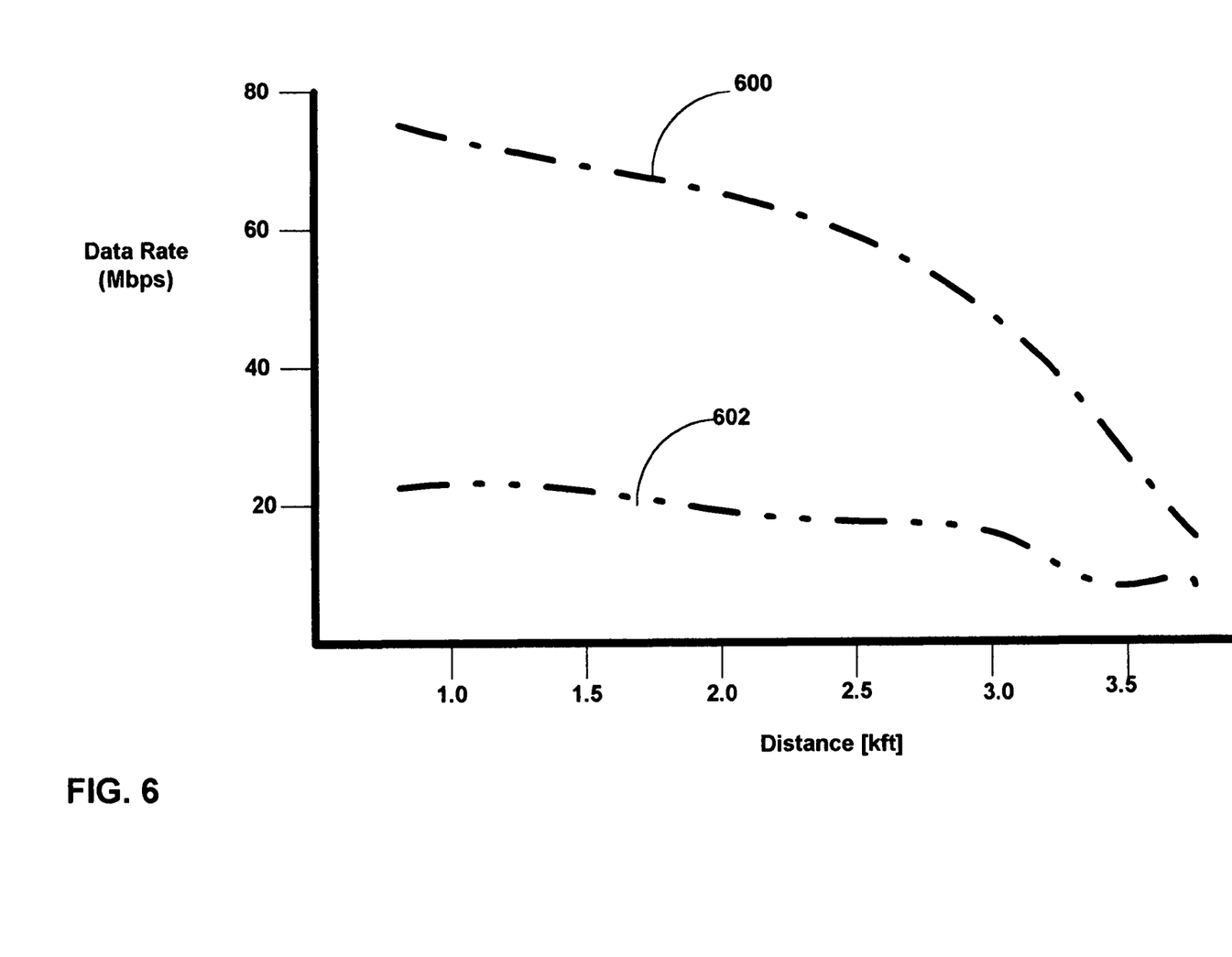
FIG. 6 is a graph showing the enhanced subscriber line data rates as a function of distance resulting from the interference canceller shown in FIG. 2–4.

FIG. 6. is a graph showing the enhanced subscriber line data rates as a function of distance resulting from the interference canceller shown in FIGS. 2–4. Line 602 shows the expected data rates as a function of distance for a channel received over a subscriber line without interference cancellation in the receiving modem. Line 600 shows a significant across the board improvement for data rate on a subscriber line coupled to a receiving modem with interference cancellation. Where no data rate improvement is necessary a reduction in transmit power or error rate may alternately be achieved by implementation of the current invention.

Figure 7:
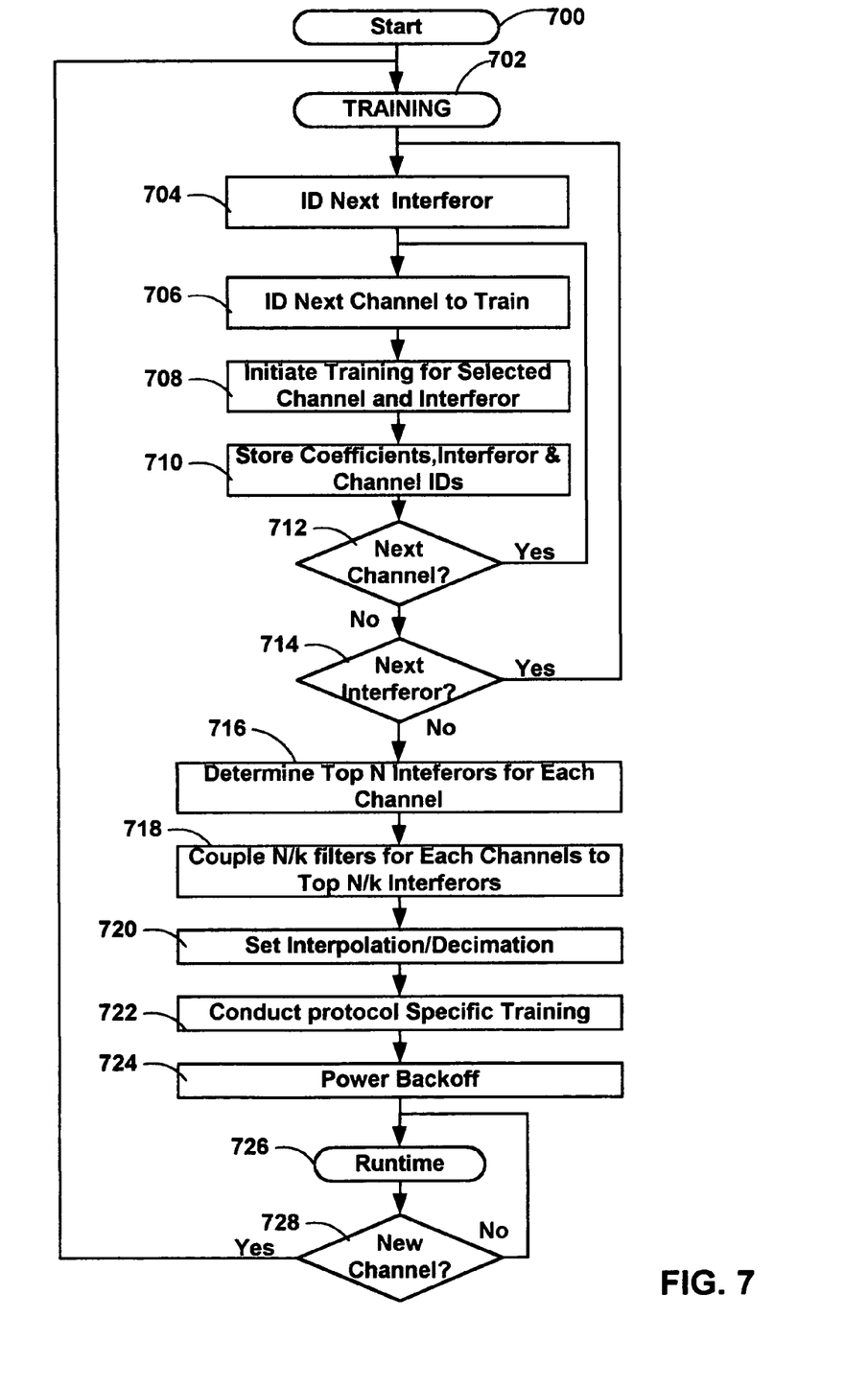
FIG. 7 is a process flow diagram timing diagram for the interference canceller shown in FIGS. 1–4.

FIG. 7 is a process flow diagram timing diagram for the interference canceller shown in FIG. 14. Processing begins at start block 700 for which control is passed to training stage 702 the first process of which is process 704, the selection of the next interferer. Control is then passed to process 706 in which the next channel to be rained is also selected. Then in 708 the training for the selected channel and interferer combination is accomplished using the adaptive filter (See FIG. 4). Control then passes to process 710. In process 710 the calculated coefficients determined in the previous process 708 as well as the channel ID of the interfering channel and the victim and/or receiving channel are stored in the filter and/or in table 222 of memory 224 (See FIG. 2). Next in decision process 712 the determination is made is to whether there is another channel for the selected interferer to be paired with. If there is then control returns to process 706 for the selection of the next channel to be paired with a selected interferer. If not control is passed to decision process 714. In decision process 714 a determination is made as to whether any interferers remain to be processed. If so, control returns to process 704. If not control is passed process 716. In process 716 a determination is made through comparison of the coefficients stored in the previous process 710 as to which among the interferes for each channel are the most significant interferers. These are ranked in order of importance. Then in process 718 the top interferers are coupled using the fabrics switch with the available filters in each channels filter bank (See FIG. 3). Control is then passed to process 720 in which the interpolator or decimator at the output of each channels filter bank is set using information supplied during session setup by the DSLAM controller 110 (See FIG. 1). Where the channel spectral characteristics calculated during the interference calculations above does not match the requirements of the assigned channel the IC signals the DSLAM accordingly.

Controls then passes to process 722 in which any additional training called for under the relevant X-DSL protocols is conducted between the remote and CO modem terminations. This session setup is commenced on channels that have a this point been characterized in terms of interference and have operative interference cancellation in effect. Control is then passed to process 724 in which any power back off that may be permitted as result of interference calculation is implemented (See FIG. 6). Control then passes to the operational or run time phase 726. This phase continues until a determination is made in decision process 728 that a new channel has been added in which event control returns to process 702 for the recommencement training.

In a process flow discussed above a one-tone pairing of interferer and receiver channel was set forth. In alternate embodiments of the invention a single receiving channel might be selected and the coefficients for all interferers of the channel would be calculated in parallel, provided there were sufficient filters to do so. In still another embodiment of the invention a selected interferer would be chosen first and the coefficients calculated for all channels.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A system for suppressing interference in a communication of data channels across a common communication medium and the system for suppressing interference comprising:

a remote set of modems coupled to a remote end of the common communication medium;

a local set of modems coupled to a local end of the common communication medium; and an interference canceller coupled with the local set of modems and configured to coordinate during a training phase, transmissions of selected interfering data channels of at least the remote set of modems with reception of at least one selected victim data channel at a corresponding one of the local set of modems and to adaptively derive at least far end crosstalk (FEXT) interference cancellation coefficients between the at least one victim data channel and the selected interfering data channels and to apply the interference cancellation coefficients during a runtime phase to communications received by the corresponding one of the local set of modems to substantially cancel at least FEXT interference therein.

2. A system for suppressing interference in a communication of data channels across a common communication medium and the system for suppressing interference comprising:

a first set of modems coupled to the common communication medium for transport and reception of corresponding data channels there through;

a second set of modems coupled to the common communication medium for transport and reception of corresponding data channels there through; and an interference canceller coupled with the second set of modems and configured to coordinate during a training phase transmissions of selected interfering data channels of the first set of modems and the second set of modems with reception of a selected victim channel at a corresponding one of the second set of modems and to adaptively derive interference cancellation coefficients between each victim data channel and each interfering data channel by combining a selected training sequence with digitized samples received by each victim data channel and resulting from a transmission of the selected training sequence by a corresponding one of the first set of modems, to adaptively derive interference cancellation coefficients which correspond with the spectral characteristics of the selected data channel between the selected one of the second set of modems and the corresponding one of the first set of modems and to apply the derived interference cancellation coefficients during a runtime phase to digitized samples of the data channels received by each of the second set of modems to substantially cancel interference in the digitized samples.

3. The system for suppressing interference of claim 2, wherein said interference canceller adaptively derives FEXT interference cancellation coefficients for each victim data channel.

4. The system for suppressing interference of claim 2, wherein said interference canceller adaptively derives self-NEXT interference cancellation coefficients to substantially cancel an echo interference on each of the victim data channels.

5. The system for suppressing interference of claim 2, wherein further said first set of modems and said second set of modems are each logical modems established by sharing signal processing power of a digital signal processor among multiple data channels.

6. The system for suppressing interference of claim 2, wherein further the common communication medium comprises a wireless medium.

7. The system for suppressing interference of claim 2, wherein further the common communication medium comprises a binder of subscriber lines.

8. The system for suppressing interference of claim 2, wherein further said data channels include data modulated in at least one X-DSL protocol.

9. The system for suppressing interference of claim 8, wherein further the at least one X-DSL protocol includes G.Lite, ADSL, VDSL, SDSL, MDSL, RADSL, and HDSL.

10. The system for suppressing interference of claim 8, wherein further the at least one X-DSL protocol includes at least one of a discrete multi-tone (DMT) line code and carrier less AM/PM (CAP) line code.

11. A system for suppressing interference in a communication of data channels across a common communication medium and the system for suppressing interference comprising:
- a first set of modems coupled to the common communication medium for transport and reception of corresponding data channels there through;
- a second set of modems coupled to the common communication medium for transport and reception of corresponding data channels there through; and
- an interference canceller coupled with the second set of modems and configured to coordinate during a training phase transmissions of selected interfering data channels of the first set of modems and the second set of modems with reception of a selected victim channel at a corresponding one of the second set of modems and to adaptively derive interference cancellation coefficients between each victim data channel and each interfering data channel and to apply the derived interference cancellation coefficients during a runtime phase to digitized samples of the data channels received by each of the second set of modems to substantially cancel interference in the digitized samples and the interference canceller including:
- banks of adaptive filters corresponding in number with a number of modems within said second set of modems and with each bank coupled to a selected one of the second set of modems and with the number of adaptive filters in each bank less in number than the number of modems; and
- a switch fabric for selectively coupling filters within each bank with selected interfering data channels of the first set of modems and the second set of modems on the basis of relative magnitudes of the interference cancellation coefficients for each of the interfering data channels.

12. A system for suppressing interference in a communication of data channels across a common communication medium and the system for suppressing interference comprising:
- a first set of modems coupled to the common communication medium for transport and reception of corresponding data channels there through;
- a second set of modems coupled to the common communication medium for transport and reception of corresponding data channels there through; and
- an interference canceller coupled with the second set of modems and configured to coordinate during a training phase transmissions of selected interfering data channels of the first set of modems and the second set of modems with reception of a selected victim channel at a corresponding one of the second set of modems and to adaptively derive interference cancellation coefficients between each victim data channel and each interfering data channel and to apply the derived interference cancellation coefficients during a runtime phase to digitized samples of the data channels received by each of the second set of modems to substantially cancel interference in the digitized samples, and the interference canceller including:
- banks of adaptive filters corresponding in number with a number of modems within said second set of modems and with each bank coupled to a selected one of the second set of modems and with the number of adaptive filters in each bank less in number than the number of modems;
- an interpolator/decimator coupled to said bank of adaptive filters to decrease and increase a number of digitized samples for each of said received signals to correspond with relative bandwidths of each of the corresponding data channels.

13. An apparatus for suppressing interference in a communication of data channels across a common communication medium and the apparatus for suppressing interference comprising:
- a plurality of analog front ends (AFE's) each coupled to the common communication medium for transmission and reception of corresponding channels of data there through;
- at least one digital signal processor (DSP) for processing the corresponding channels of data; and
- an interference canceller coupled with the at least one DSP and configured to coordinate during a training phase transmissions of selected interfering data channels with reception of a selected victim channel at a corresponding one of a plurality of AFEs to adaptively derive interference cancellation coefficients between each victim data channel and each interfering data channel by combining a selected training sequence with digitized samples received by a selected one of the plurality of AFEs and resulting from a transmission across the common communication medium of the selected training sequence via a selected data channel, to adaptively derive interference cancellation coefficients which correspond with the spectral characteristics of the selected data channel and to apply the derived interference cancellation coefficients during a runtime phase to digitized samples of the data channels received by each corresponding one of the plurality of AFEs to substantially cancel interference in the digitized samples.

14. The apparatus for suppressing interference of claim 13, wherein said interference canceller adaptively derives FEXT interference cancellation coefficients for each victim data channel.

15. The apparatus for suppressing interference of claim 13, wherein said interference canceller adaptively derives self-NEXT interference cancellation coefficients to substantially cancel an echo interference on each of the victim data channels.

16. The apparatus for suppressing interference of claim 13, wherein further the common communication medium comprises a wireless medium.

17. The apparatus for suppressing interference of claim 13, wherein further the common communication medium comprises a binder of subscriber lines.

18. The apparatus for suppressing interference of claim 13, wherein further the data channels include data modulated in at least one X-DSL protocol.

19. The apparatus for suppressing interference of claim 18, wherein further said at least one X-DSL protocol includes G.Lite, ADSL, VDSL, SDSL, MDSL, RADSL, and HDSL.

20. The apparatus for suppressing interference of claim 18, wherein further said the at least one X-DSL protocol includes at least one of a discrete multi-tone (DMT) line code and carrier less AM/PM (CAP) line code.

21. An apparatus for suppressing interference in a communication of data channels across a common communication medium and the apparatus for suppressing interference comprising:

a plurality of analog front ends (AFE's) each coupled to common communication medium for transmission and reception of corresponding channels of data there through:

at least one digital signal processor (DSP) for processing the corresponding channels of data; and an interference canceller coupled with the at least one DSP and configured to coordinate during a training phase transmissions of selected interfering data channels with reception of a selected victim channel at a corresponding one of the plurality of AFEs to adaptively derive interference cancellation coefficients between each victim data channel and each interfering data channel and to apply the derived interference cancellation coefficients during a runtime phase to digitized samples of the data channels received by each corresponding one of the plurality of AFEs to substantially cancel interference in the digitized samples and the interference canceller including:

banks of adaptive filters corresponding in number with a number of said AFEs and with each bank coupled to a selected one of said AFEs and said DSP and with the number of adaptive filters in each bank less in number than the number of modems; and a switch fabric for selectively coupling filters within each bank with selected interfering data channels transmitted and received by said AFE's on the basis of relative magnitudes of the interference cancellation coefficients for each of the interfering data channels.

22. An apparatus for suppressing interference in a communication of data channels across a common communication medium and the apparatus for suppressing interference comprising:

a plurality of analog front ends (AFE's) each coupled to common communication medium for transmission and reception of corresponding channels of data there through;

at least one digital signal processor (DSP) for processing the corresponding channels of data; and an interference canceller coupled with the at least one DSP and configured to coordinate during a training phase transmissions of selected interfering data channels with reception of a selected victim channel at a corresponding one of the plurality of AFEs to adaptively derive interference cancellation coefficients between each victim data channel and each interfering data channel and to apply the derived interference cancellation coefficients during a runtime phase to digitized samples of the data channels received by each corresponding one of the plurality of AFEs to substantially cancel interference in the digitized samples and the interference canceller including;

banks of adaptive filters corresponding in number with a number of AFEs and with each bank coupled to a selected one of the AFEs and the DSP and with the number of adaptive filters in each bank less in number than the number of modems;

an interpolator/decimator coupled to said bank of adaptive filters to decrease and increase a number of digitized samples for each of said received signals to correspond with relative bandwidths of each of the corresponding data channels.

23. A method for suppressing interference in a communication of data channels across a common communication medium and the system for suppressing interference comprising the acts of:

adaptively filtering selected transmitted interfering data channels with at least one selected received data channel to determine during a training phase interference cancellation coefficients there between;

selecting for each received data channel at least one significant interfering data channel among the transmitted data channels based on said interference cancellation coefficients determined in said act of adaptively filtering; and exclusively applying during a runtime phase the interference cancellation coefficients associated with the at least one significant interfering data channel selected in said selecting act to digitized samples of each corresponding received data channel to substantially cancel interference in the digitized samples.

24. The method for suppressing interference of claim 23, further comprising the act of:

varying a number of the digitized samples to correspond with a bandwidth of the corresponding received data channel.

25. The method for suppressing interference of claim 23, wherein the adaptively filtering act further comprises the act of:

training the at least one selected received data channel concurrently with all interfering data channels.

26. The method for suppressing interference of claim 23, wherein the at least one selected received data channel includes all received data channels and the adaptively filtering act further comprises the act of:

training all of the received data channels with a selected one of the interfering data channels.

* * * * *